United States Patent [19]

Dalton

[11] Patent Number: 5,377,435
[45] Date of Patent: Jan. 3, 1995

[54] DISPLAY DEVICE AND METHOD FOR MATURE EARS OF SEED AND FIELD CORN

[76] Inventor: Eldon L. Dalton, 8583 S. Highway 231, Rensselaer, Ind. 47978

[21] Appl. No.: 92,229

[22] Filed: Jul. 15, 1993

[51] Int. Cl.[6] ............................................. G09F 23/00
[52] U.S. Cl. ...................................... 40/645; 211/59.1
[58] Field of Search ........................ 40/645, 606, 607; 208/309.2; 211/119, 113, 59.1, 106

[56] References Cited

U.S. PATENT DOCUMENTS

| | | | |
|---|---|---|---|
| 782,811 | 2/1905 | Ames | 40/607 |
| 1,231,544 | 6/1917 | Brown | 211/119 |
| 1,482,649 | 2/1924 | Hayden | 211/59.1 |
| 4,367,819 | 1/1983 | Lewis | 211/59.1 |

FOREIGN PATENT DOCUMENTS 105956  11/1964  Denmark ........................ 211/59.1

OTHER PUBLICATIONS

Photographs 1, 2 and 3 is a decorative device used for displaying Indian corn in a home.
Photographs 4, 5 and 6 is a device used by farmers, when harvesting corn by hand, to place ears of corn on the spindles of the device that were to be used for seed the following year, and the device was then hung up inside a farm building to allow the corn to dry.

Primary Examiner—Kenneth J. Dorner
Assistant Examiner—Cassandra Davis
Attorney, Agent, or Firm—Clifford W. Browning

[57] ABSTRACT

The display device and method for mature ears of seed and field corn of the present invention provides a novel means for displaying for inspection mature ears of seed and field corn that have been husked and broken off the corn plant. A plurality of spindles onto which mature ears of husked corn may be impaled are affixed to a mounting bar, which in turn is mounted on the sign post bearing the sign identifying the variety of seed or field corn planted in the corn row behind it. Mature ears of corn of the variety identified on the sign above where the mounting bar is mounted are then removably impaled on the spindles, which in the preferred embodiment to date are affixed to the mounting bar so that they project upwardly at an angle of about 45 degrees with reference to the sign post.

3 Claims, 7 Drawing Sheets

DISPLAY DEVICE AND METHOD FOR MATURE EARS OF SEED AND FIELD CORN

BACKGROUND OF THE INVENTION

The present invention relates generally to devices for displaying mature farm products, and more specifically to a novel display device and method for mature ears of seed and field corn.

Seed and field corn companies typically plant test plots of seed and field corn to display the seed and field corn varieties that they have available for sale. There may be as many as 40 or more different varieties of seed and field corn displayed in a single test plot. Each variety of seed and field corn in a test plot is typically identified by a sign mounted on a sign post that is placed in the test plot's corn rows at the point where each variety begins.

When the test plot's seed and field corn mature, seed and field corn buyers typically walk the rows of the test plot and strip the husks from mature ears of corn to compare and contrast the quality of each variety with the other varieties present in the test plot. If mature ears are broken off to allow closer inspection, they are typically laid on the ground after inspection. Of course, mature ears that are husked but left on the plant cannot be inspected or compared and contrasted with other varieties in the test plot as conveniently.

SUMMARY OF THE INVENTION

The display device and method for mature ears of seed and field corn of the present invention provides a novel means for displaying for inspection mature ears of seed and field corn that have been husked and broken off the corn plant. A plurality of spindles onto which mature ears of husked corn may be impaled are affixed to a mounting bar, which in turn is mounted on the sign post bearing the sign identifying the variety of seed and field corn planted in the corn row behind it. Mature ears of corn of the variety identified on the sign above where the mounting bar is mounted are then removably impaled on the spindles, which in the preferred embodiment to date are affixed to the mounting bar so that they project upwardly at an angle of about 45 degrees with reference to the sign post.

Seed and field corn buyers may then remove from any one of the plurality of spindles a mature ear of seed and field corn of the variety identified on the sign appearing above it. The buyer may then conveniently inspect it, compare and contrast it with other varieties of seed and field corn similarly displayed throughout the test plot, and then impaled it again upon the spindle from which the buyer first retrieved it.

One embodiment of the present invention comprises a display device for mature ears of seed and field corn, comprising an elongated mounting bar having a first end portion, a second end portion, and a through hole provided in each of the end portions whereby the mounting bar may be secured to a substrate with conventional fasteners, and a plurality of elongated spindles affixed to the mounting bar between the first and second end portions and disposed on the mounting bar so as to extend generally upwardly when the mounting bar is secured to a substrate whereby a mature ear of seed or field corn may be impaled upon any one of the elongated spindles and not fall therefrom under the influence of gravitational forces.

Another embodiment of the present invention comprises a display device for mature ears of seed and field corn, comprising a sign post supporting a sign that bears the identity of a specific seed and field corn variety, an elongated mounting bar, having a first end portion and a second end portion, that is secured to the sign post, and a plurality of elongated spindles affixed to the mounting bar between the first and second end portions and disposed on the mounting bar so as to extend generally upwardly whereby a mature ear of seed or field corn of the variety identified on the sign may be impaled upon any one of the elongated spindles and not fall therefrom under the influence of gravitational forces.

Yet another embodiment of the present invention comprises a method for displaying mature ears of seed and field corn, comprising the steps of providing an elongated mounting bar having a first end portion, a second end portion, a through hole provided in each of the end portions whereby the mounting bar may be secured to a substrate by conventional fasteners, and a plurality of elongated spindles affixed to the mounting bar between the first and second end portions and disposed on the mounting bar so as to extend generally upwardly when the mounting bar is secured to a substrate, securing the mounting bar to a substrate so that the spindles extend generally upwardly, and impaling a mature ear of seed or field corn upon any one of the spindles.

It is a principle object of the present invention to provide a more convenient device and method for displaying mature ears of seed and field corn in seed and field corn company test plots.

Related objects and advantages of the present invention will be apparent from the following description of the preferred embodiments.

DESCRIPTION OF THE PREFERRED EMBODIMENT

Figure 1:
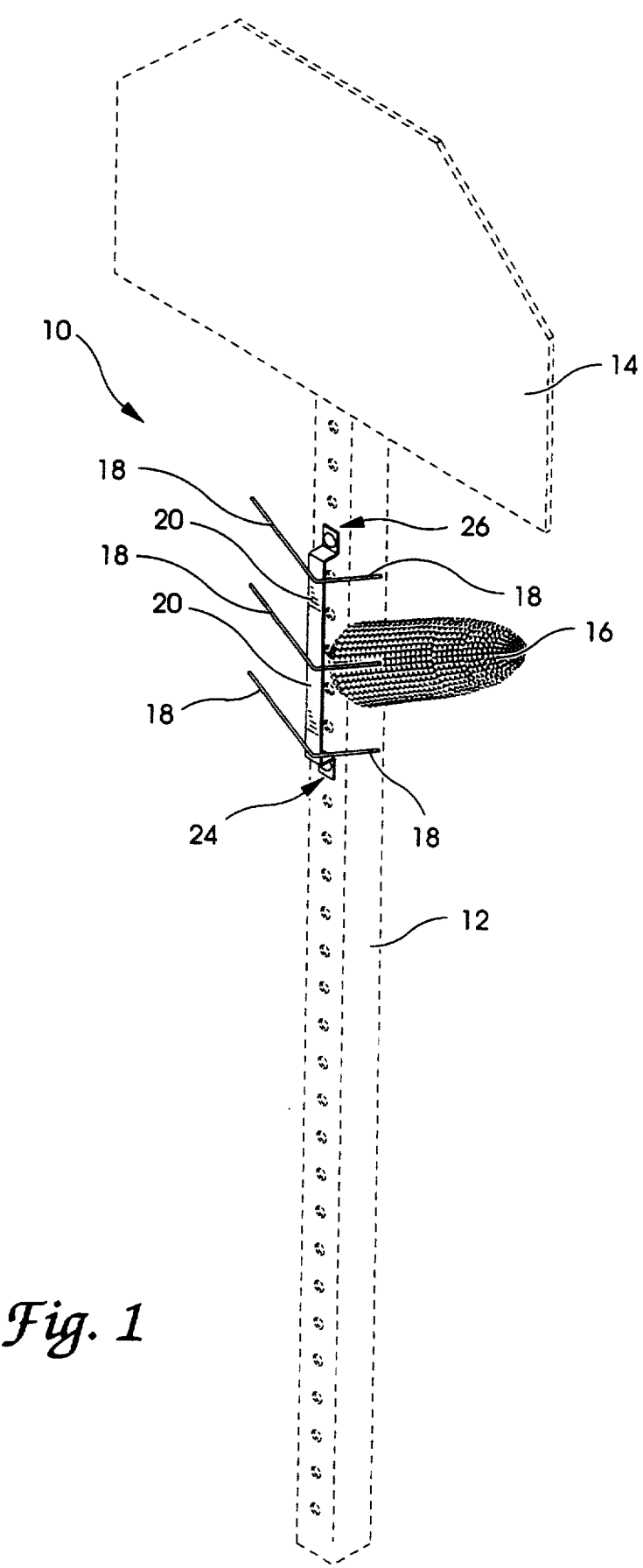
FIG. 1 is a perspective view of a preferred embodiment of the display device for mature ears of seed and field corn of the present invention, which is shown mounted to a typical sign post supporting a sign identifying DeKalb 636 variety seed and field corn, and which is shown with a mature ear of DeKalb 636 variety seed and field corn impaled upon a spindle thereof.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
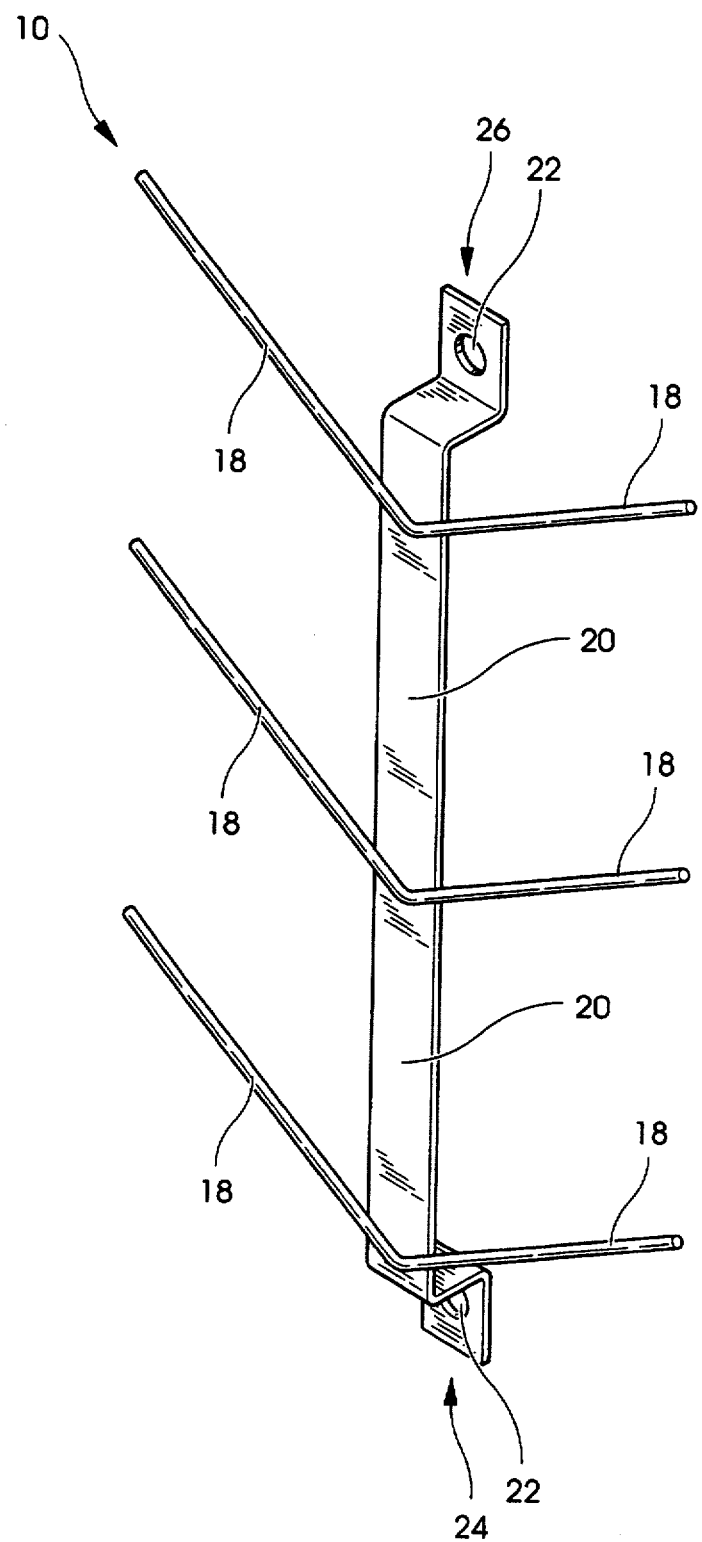
FIG. 2 is a perspective view of the display device of the FIG. 1 without the sign post, sign, and ear of corn.
Figure 5:
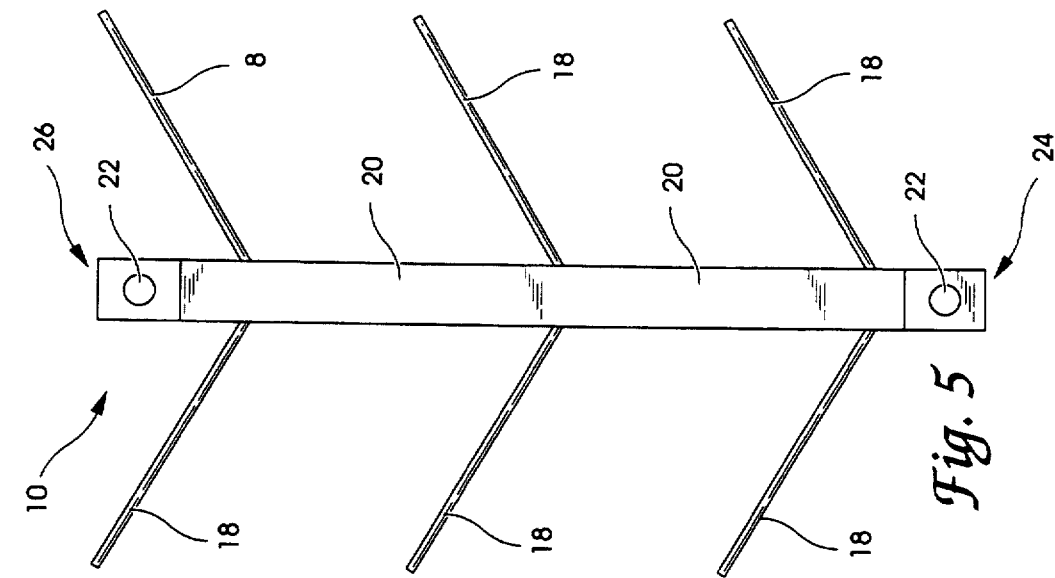
FIG. 5 is a rear view of the display device of the FIG. 2.
Figure 4:
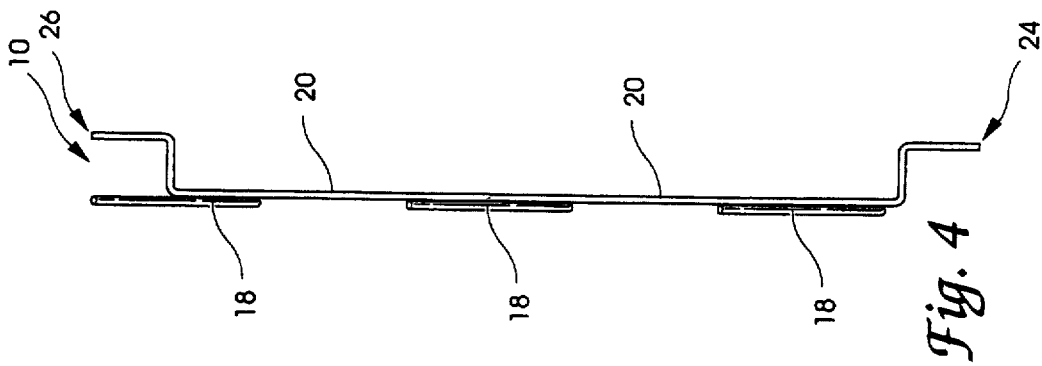
FIG. 4 is a left side view of the display device of the FIG. 2.
Figure 3:
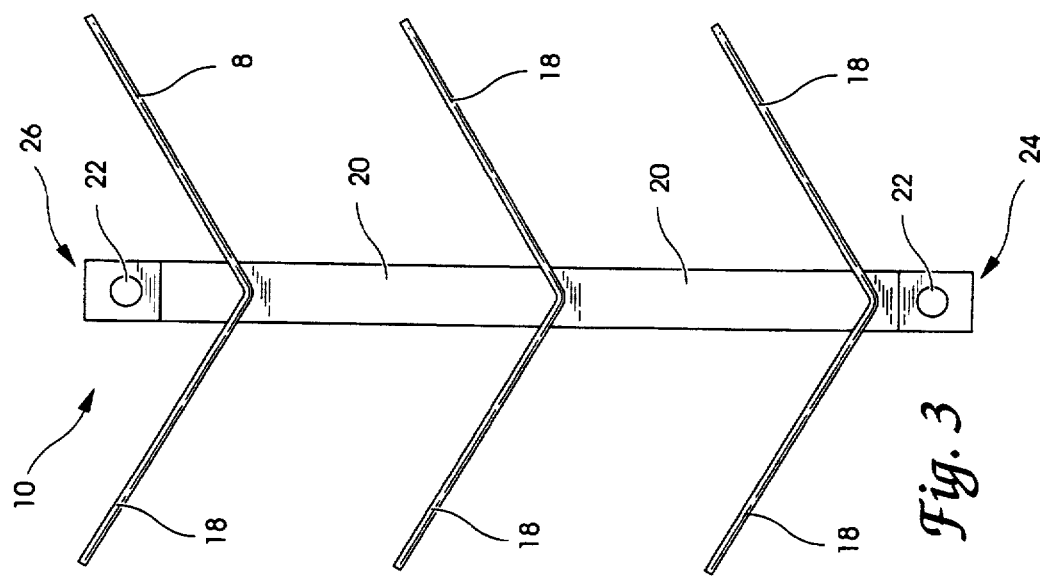
FIG. 3 is a front view of the display device of the FIG. 2.
Figure 6:
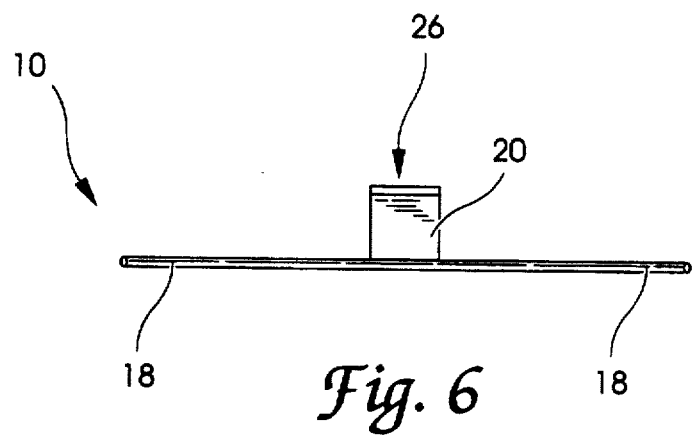
FIG. 6 is a top view of the display device of the FIG. 2.
Figure 7:
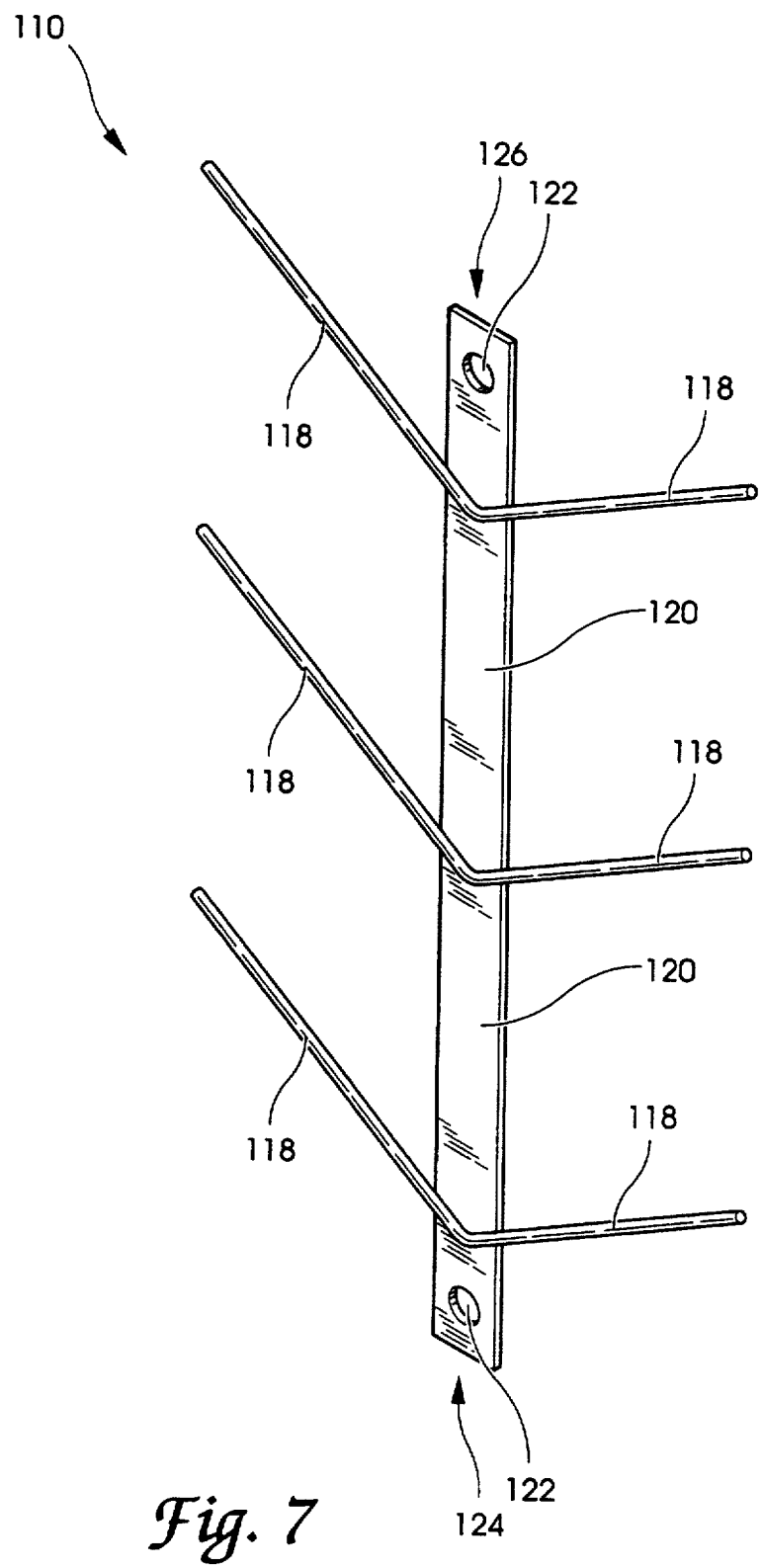
FIG. 7 is a perspective view of an alternative and equally preferred embodiment of the display device for mature ears of seed and field corn of the present invention.
Figure 10:
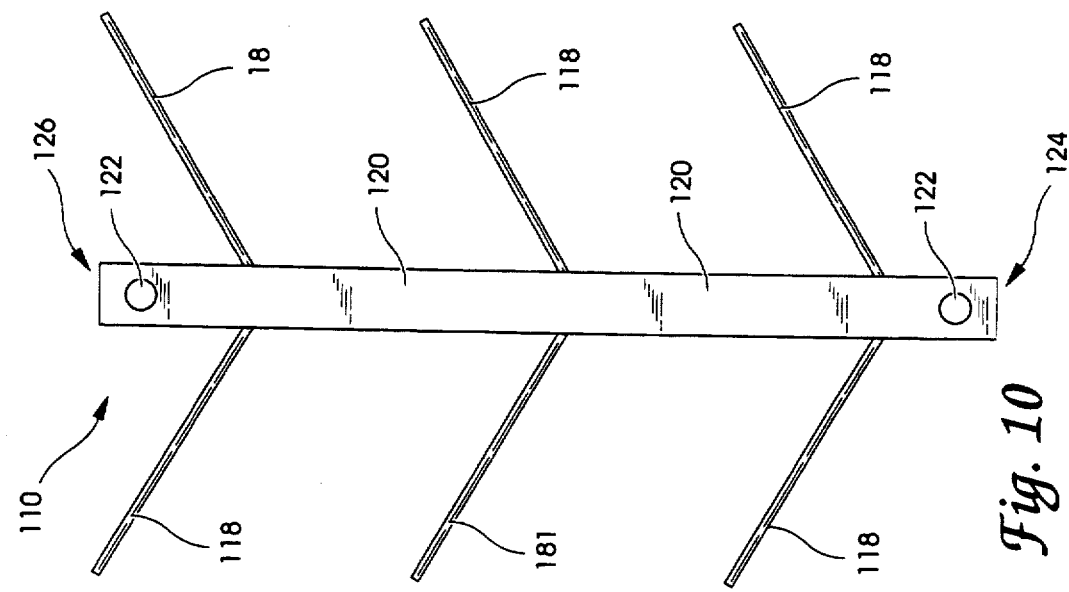
FIG. 10 is a rear view of the display device of the FIG. 7.
Figure 9:
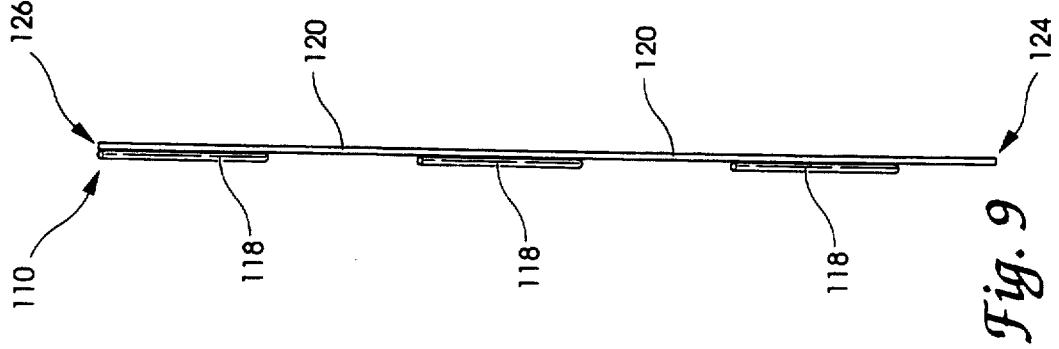
FIG. 9 is a left side view of the display device of the FIG. 7.
Figure 8:
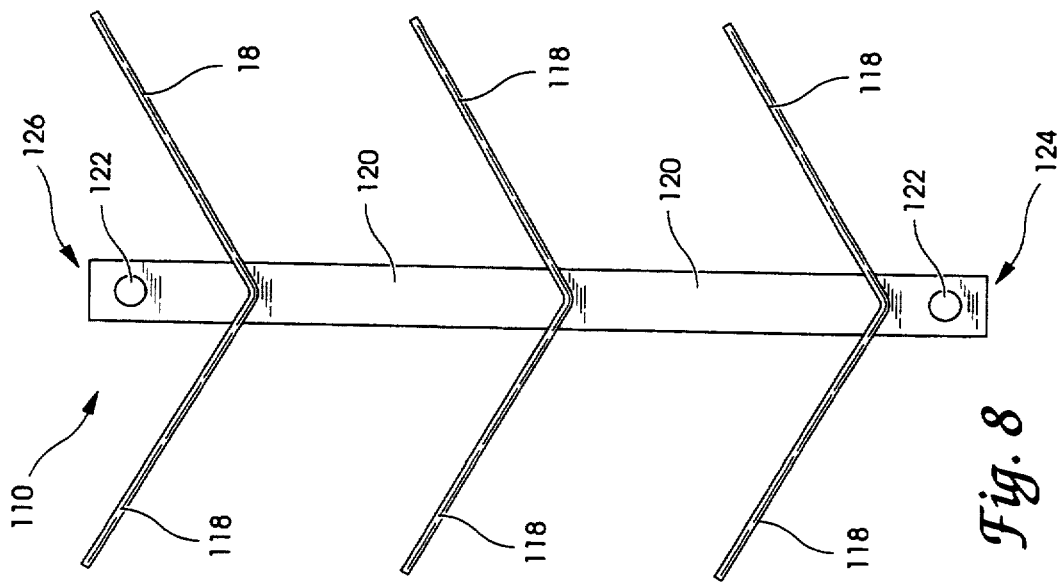
FIG. 8 is a front view of the display device of the FIG. 7.
Figure 11:
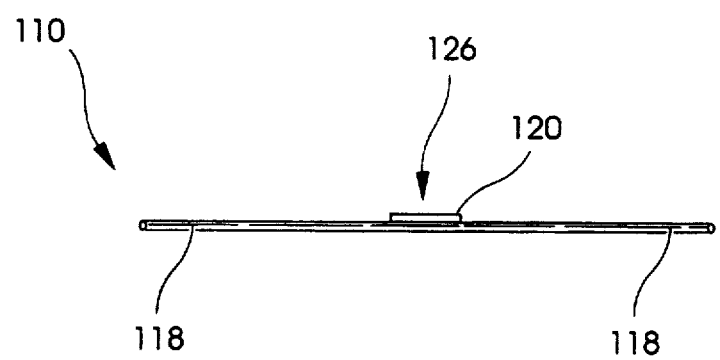
FIG. 11 is a top view of the display device of the FIG. 7.

Referring now to FIGS. 1 and 2 of the drawings, FIG. 1 illustrates a perspective view of a preferred embodiment of the display device for mature ears of seed and field corn 10 of the present invention, which is shown mounted by conventional means to a typical sign post 12 that supports a sign 14 identifying DeKalb 636 variety seed and field corn, and with a mature ear of DeKalb 636 variety seed and field corn 16 impaled upon a spindle 18 thereof. FIG. 2 is a perspective view of the display device for mature ears of seed and field corn 10 of FIG. 1 without the broken lines representing the sign post 12 and sign 14.

Referring also to FIGS. 3-6, in the preferred embodiment to date, a plurality of spindles 18 onto which mature ears of husked corn 16 may be impaled are affixed to an elongated mounting bar 20, which in turn is mounted by conventional means, utilizing through holes 22 provided therein, to a sign post 12 (FIG. 1). Mature ears of corn 16 of the variety identified on a sign 14 mounted on the sign post 12 are then removably impaled on the spindles 18, which, in the preferred embodiment to date, are affixed to the mounting bar so that each spindle projects upwardly at an angle of about 45 degrees with respect to mounting bar 20.

In the preferred embodiment of the display device for mature ears of seed and field corn 10 illustrated in FIGS. 1-6, the end portions 24 and 26 of mounting bar 20 have been provided with two 90 degree bends such that the through holes 22 lie in approximately the same plane, which is substantially parallel to the plane in which the portion of the mounting bar 20 to which the spindles 18 are affixed lies. This construction allows more clearance between the mature ears of corn that are impaled upon the spindles 18 and the surface to which the mounting bar may be mounted, such as the sign post 12 of FIG. 1. Referring now to FIGS. 7-11, when additional clearance of this type is not required due to the character of the surface to which the mounting bar 20 will be mounted, an equally preferred embodiment 110 of the present invention is constructed from a mounting bar 120 that is without two 90 degree bends at its end portions. In all other respects, the construction and use of the embodiment of FIGS. 7-11 are identical to the construction and use of the embodiment of FIGS. 1-6, with the corresponding parts in FIGS. 7-11 being Labeled with corresponding one hundred series numbers of the parts of FIGS. 1-6.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A display device for mature ears of seed and field corn, comprising:

a post supporting a sign;

an elongated mounting bar, having a first end portion and a second end portion, secured to said post; and a plurality of elongated spindles affixed to said mounting bar between said first and second end portions and disposed on said mounting bar so as to extend generally upwardly whereby a mature ear of corn may be impaled upon any one of said elongated spindles and not fall therefrom under the influence of gravitational forces.

2. A method for displaying mature ears of seed and field corn, comprising the steps of:

providing an elongated mounting bar having a first end portion, a second end portion, and a plurality of elongated spindles affixed to said mounting bar between said first and second end portions and disposed on said mounting bar so as to extend generally upwardly when said mounting bar is secured to a substrate;

securing said mounting bar to a post;

locating said post in a corn test plot in proximity to a specific corn variety so that said spindles extend generally upwardly; and impaling at least one mature ear of corn of the variety in proximity to said post upon any one of said spindles.

3. The method for displaying mature ears of seed and field corn of claim 2 wherein the post of said securing step supports a sign.

* * * * *

UNITED STATES PATENT AND TRADEMARK OFFICE
CERTIFICATE OF CORRECTION

PATENT NO. : 5,377,435
DATED : January 3, 1995
INVENTOR(S) : Eldon L. Dalton

It is certified that error appears in the above-identified patent and that said Letters Patent is hereby corrected as shown below:

In column 3, line 21, the word "arid" should be changed to --and--.

Signed and Sealed this

Fourteenth Day of March, 1995

Attest:

BRUCE LEHMAN

Attesting Officer

Commissioner of Patents and Trademarks